United States Patent [19]
Izawa et al.

[11] Patent Number: 5,747,952
[45] Date of Patent: May 5, 1998

[54] LINEAR MOTOR, APPARATUS, ARMATURE COIL CURRENT SUPPLY CIRCUIT FOR LINEAR MOTOR, AND METHOD OF SUPPLYING CURRENT TO ARMATURE COIL OF LINEAR MOTOR

[75] Inventors: Makoto Izawa, Kariya; Katsuhiro Nanba, Okazaki, both of Japan

[73] Assignee: Minolta Co., Ltd., Osaka, Japan

[21] Appl. No.: 831,331

[22] Filed: Mar. 31, 1997

[30] Foreign Application Priority Data

Apr. 2, 1996 [JP] Japan ................................. 8-079864

[51] Int. Cl.$^6$ ................................................. H02K 41/00
[52] U.S. Cl. ................................................. 318/135; 310/12
[58] Field of Search ............................... 318/135, 138, 318/254, 439; 310/12

[56] References Cited

U.S. PATENT DOCUMENTS

| | | |
|---|---|---|
| 4,436,416 | 3/1984 | Negoro et al. .................. 399/202 X |
| 4,837,467 | 6/1989 | Newman ............................. 310/12 |
| 5,081,381 | 1/1992 | Narasaki ............................. 310/12 |
| 5,493,188 | 2/1996 | Yoshikawa et al. ................ 318/254 |

FOREIGN PATENT DOCUMENTS 07181601   7/1995   Japan.

*Primary Examiner*—Steven L. Stephan
*Assistant Examiner*—Judson H. Jones
*Attorney, Agent, or Firm*—McDermott, Will & Emery

[57] ABSTRACT

A linear motor apparatus includes a stator extending in a predetermined direction and having a field magnet for driving; a movable piece having an armature coil opposed to the field magnet, and being reciprocatable along the stator; a Hall element disposed at a portion on the movable piece opposed to the field magnet for outputting a voltage signal depending on an intensity and a direction of a magnetic field formed by the field magnet as well as a Hall element reference input voltage supplied thereto; a correction circuit for producing an output signal by correcting an output signal issued from the Hall element to have a cycle equal to that of the Hall element output signal and a constant maximum amplitude depending on the Hall element reference input voltage; and a current supply circuit for supplying a current, depending on the output voltage issued from the correction circuit, to the armature coil for producing a driving force of the movable piece.

22 Claims, 5 Drawing Sheets

Fig.2(A)
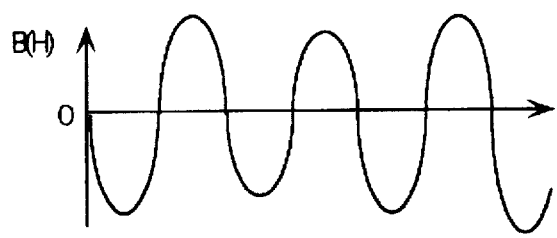
Fig.2(B)
Fig.2(C)
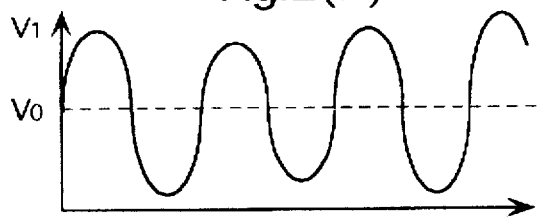
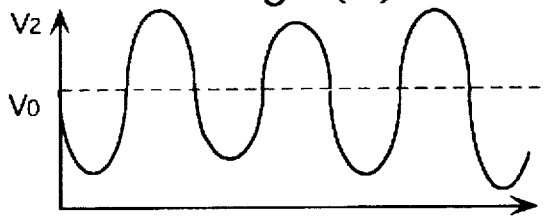
Fig.2(D)
Fig.2(E)
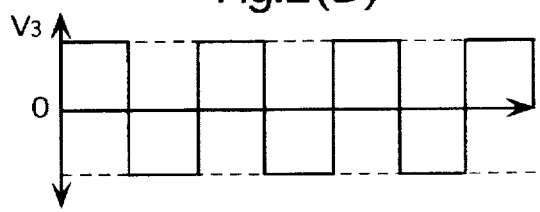
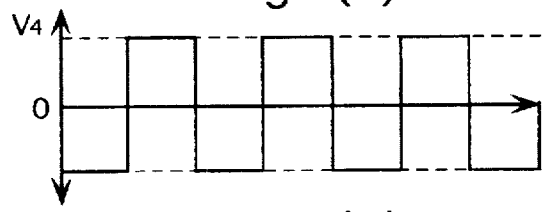
Fig.2(F)
Fig.2(G)
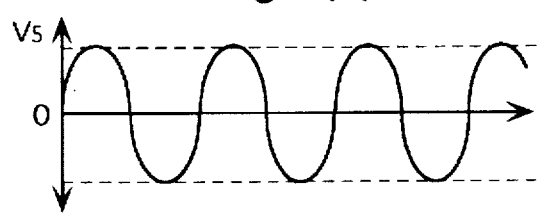
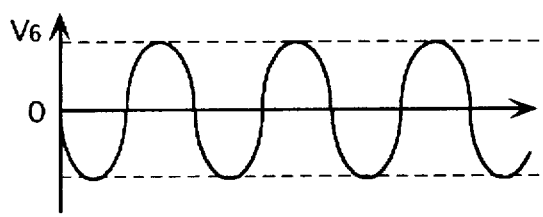
Fig.2(H)
Fig.2(I)
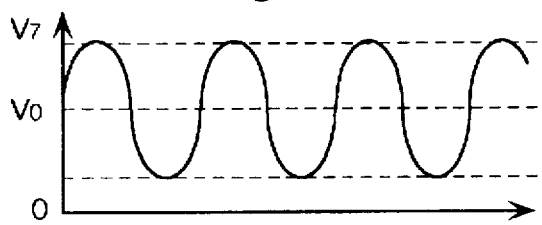
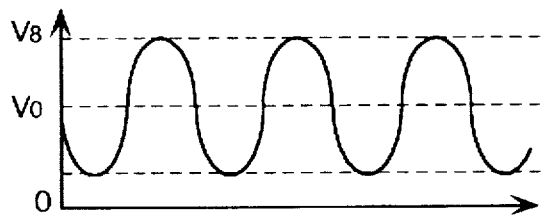
Fig.2(J)
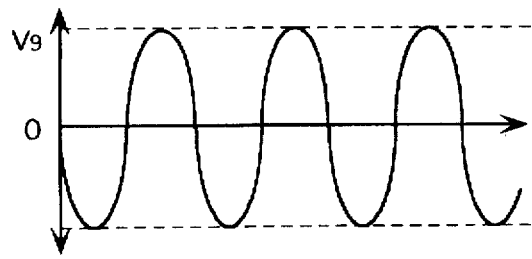

LINEAR MOTOR, APPARATUS, ARMATURE COIL CURRENT SUPPLY CIRCUIT FOR LINEAR MOTOR, AND METHOD OF SUPPLYING CURRENT TO ARMATURE COIL OF LINEAR MOTOR

BACKGROUND OF THE INVENTION

1. Field of the Invention

The present invention relates to a linear motor apparatus, a circuit for supplying a current to an armature coil of a linear motor and a method of supplying a current to an armature coil of a linear motor, and in particular to a linear motor apparatus which has a linear motor employing Hall elements, a current supply circuit to an armature coil of such a linear motor and a method of supplying a current to an armature coil of such a linear motor.

2. Description of the Related Art

Various types of linear motors have been developed and applied to various kinds of equipments.

A linear motor generally includes a part having a field magnet for propulsion or driving, and a part having an armature coil opposed to the field magnet. Between these parts, one is used as a stator or a stationary piece, and the other is used as a movable piece to be driven along the stator.

Linear motors which can be applied to various types of equipments are often desired to generate a constant driving force regardless of the position of the movable piece relative to the position of the stator. For example, this is true in the case where a linear motor is used as drive means for a slider carrying an optical unit of an image reading device arranged in a copying machine or the like.

In general, a so-called three-phase drive is known as a drive system which can generate a constant driving force regardless of the positional relationship between the movable piece and the stator. This drive system drives the linear motor in the following manner.

For example, a linear motor LDM shown in FIGS. 3(A) and 3(B) includes a field magnet 61 operating as a stator 6, and an armature coil 71 operating as a movable piece 7. In this linear motor LDM, the field magnet 61 is formed of a plurality of N-pole and S-pole magnets alternately arranged in the longitudinal direction. Thereby, the field magnet 61 provides the magnetic flux distribution having a sinusoidal form in the longitudinal direction. Effective conductors, which contribute to production of driving forces by armature coils Lu, Lv and Lw, respectively, are arranged at positions shifted from each other by $2\pi/3$ (radian) of the phase angle of the sinusoidal wave of the above magnetic field (or at positions of the same phases as those shifted from each other by $2\pi/3$).

Coils Lu, Lv and Lw are supplied with currents Iu, Iv and Iw which are proportional to magnitudes and directions of magnetic flux densities Bu, Bv and Bw at the positions of the effective conductors of these coils, respectively. When the magnetic flux density Bu is expressed by the following formula (1):

$$Bu = B_0 \sin\theta \quad (1)$$

the magnetic flux densities Bv and Bw are expressed as follows:

$$Bv = B_0 \sin(\theta - 2\pi/3) \quad (2)$$

$$Bw = B_0 \sin(\theta - 4\pi/3) \quad (3)$$

where $B_0$ represents the maximum amplitude of the magnetic flux density, and $\theta$ represents the phase angle.

Since the currents Iu, Iv and Iw are determined to be proportional to the magnitudes and directions of the magnetic flux densities Bu, Bv and Bw, respectively, they can be expressed as follows:

$$Iu = k_1 B_0 \sin\theta \quad (4)$$

$$Iv = k_1 B_0 \sin(\theta - 2\pi/3) \quad (5)$$

$$Iw = k_1 B_0 \sin(\theta - 4\pi/3) \quad (6)$$

where $k_1$ is a constant. In this case, the linear motor produces a driving force F which is expressed as follows:

$$F = k_2(Bu \cdot Iu + Bv \cdot Iv + Bw \cdot Iw) = 3k_2 B_0^2/2$$

where $k_2$ is a constant proportional to an effective conductor length and a number of turns of the coil. Therefore, the driving force F can be constant regardless of the positional relationship between the stator and the movable piece.

As an armature coil current supply circuit of a linear motor for the above three-phase driving, such a circuit $C_3$ employing Hall elements shown in FIG. 5 has been known. This circuit $C_3$ is generally called a push-pull type circuit. Hall elements hu, hv and hw are arranged at the effective conductors of the armature coils Lu, Lv and Lw, respectively.

A Hall element is a magnetoelectric device, and is operable to output a voltage depending on an input voltage $V_{in}$ supplied to the Hall element as well as the intensity and direction of the magnetic field at the position of the Hall element. In the circuit $C_3$, outputs of the Hall elements hu, hv and hw arranged at the effective conductors of the armature coils Lu, Lv and Lw are amplified by differential amplifiers 40u, 40v and 40w, and are supplied to the armature coils Lu, Lv and Lw, respectively. Thereby, currents, which depend on the input voltage $V_{in}$ as well as the intensities and directions of the magnetic fields at the positions of the Hall elements, can be supplied to the armature coils, respectively. Thereby, the linear motor can generate a constant driving force regardless of the positional relationship between the movable piece and the stator.

However, the field magnet cannot actually provide the sinusoidal magnetic flux distribution of a constant maximum amplitude due to an error at the process of magnetization, and therefore the outputs of the Hall elements have different maximum amplitudes. This results in variation in maximum amplitude $B_0$ of the magnetic flux density in the formulas (1)–(6), so that the driving force F cannot be constant, and varies substantially proportional to the square value of the maximum amplitude $B_0$.

SUMMARY OF THE INVENTION

Accordingly, it is an object of the invention to provide a linear motor apparatus including:

a linear motor having a drive field magnet and an armature coil opposed to the field magnet and provided with a Hall element for detecting an intensity and a direction of a magnetic field produced by the field magnet, and a current supply circuit for supplying a current to the armature coil of the linear motor to produce a driving force of the linear motor; and more specifically the linear motor apparatus which can reduce an influence exerted on the driving force of the linear motor by possible variation in the maximum amplitude of the magnetic field formed by the field magnet.

Another object of the invention is to provide the linear motor apparatus described above, which can reduce variation in the driving force of the linear motor performing three-phase driving.

Still another object of the invention is to provide an armature coil current supply circuit for a linear motor including a drive field magnet, and an armature coil opposed to the field magnet and provided with a Hall element for detecting an intensity and a direction of the magnetic field produced by the field magnet, the armature coil current supply circuit being provided for supplying a current to the armature coil for producing a driving force of the linear motor; and more specifically, the armature coil current supply circuit which can reduce an influence exerted on the driving force of the linear motor by possible variation in the maximum amplitude of the magnetic field produced by the field magnet.

Yet another object of the invention is to provide a method for supplying a current to an armature coil of a linear motor for producing a driving force of the linear motor, the linear motor including a drive field magnet, and the armature coil opposed to the field magnet and provided with a Hall element for detecting an intensity and a direction of the magnetic field produced by the field magnet; and more specifically, the armature coil current supply method which can reduce an influence exerted on the driving force of the linear motor by possible variation in the maximum amplitude of the magnetic field produced by the field magnet.

The invention provides a linear motor apparatus including:

a stator extending in a predetermined direction and having a field magnet for driving;

a movable piece having an armature coil opposed to the field magnet, and being reciprocatable along the stator;

a Hall element disposed at a portion on the movable piece opposed to the field magnet for outputting a voltage signal depending on an intensity and a direction of a magnetic field formed by the field magnet as well as a Hall element reference input voltage supplied thereto;

a correction circuit for producing an output signal by correcting an output signal issued from the Hall element to have a cycle equal to that of the Hall element output signal and a constant maximum amplitude depending on the Hall element reference input voltage; and a current supply circuit for supplying a current, depending on the output voltage issued from the correction circuit, to the armature coil for producing a driving force of the movable piece.

The invention also provides an armature coil current supply circuit for a linear motor provided with a stator having a field magnet for driving and a movable piece having an armature coil opposed to the field magnet, including:

a Hall element disposed at a portion on the movable piece, opposed to the field magnet at the position where the armature coil is opposed to the field magnet, and being operable to output a voltage signal depending on an intensity and a direction of a magnetic field formed by the field magnet as well as a Hall element reference input voltage supplied to the Hall element;

a correction circuit for producing an output signal by correcting the output signal issued from the Hall element to have a cycle equal to that of the Hall element output signal and a constant maximum amplitude depending on the Hall element reference input voltage; and a current supply circuit for supplying a current, depending on the output voltage issued from the correction circuit, to the armature coil for producing a driving force of the movable piece.

The invention further provides a method of supplying a current to an armature coil of a linear motor including a field magnet for driving, and the armature coil opposed to the field magnet and provided with a Hall element for outputting a voltage signal depending on an intensity and a direction of a magnetic field formed by the field magnet as well as a Hall element reference input voltage supplied to the Hall element, wherein the Hall element output signal issued from the Hall element is corrected to have a cycle equal to that of the Hall element output signal and a constant maximum amplitude depending on the Hall element reference input voltage; and a current depending on the corrected voltage signal is supplied to the armature coil.

In any one of the linear motor apparatus, the armature coil current supply circuit and the method for supplying the current to the armature coil according to the invention, when the current is supplied to the armature coil opposed to the field magnet, the linear motor produces a driving force owing to an interaction between the magnetic field formed by the field magnet and the current flowing through the armature coil.

In this operation, the Hall element detects the intensity and direction of the magnetic field formed by the field magnet at the position where the armature coil is opposed to the field magnet, and issues the voltage signal depending on the detected intensity and direction of the magnetic field as well as the supplied Hall element input voltage. The Hall element output signal is corrected to have the same cycle as the Hall element output signal and to have the constant maximum amplitude depending on the Hall element reference input voltage. The current depending on the corrected voltage signal is supplied to the armature coil.

Therefore, when the magnetic field formed by the field magnet along the relative moving direction of the field magnet and the armature coil has, for example, a substantially sinusoidal waveform, and thus the maximum amplitude of the magnetic field formed by the field magnet varies in the sinusoidal form, the following operation is performed for energizing the armature coil to produce the driving force which moves the armature coil and the field magnet relatively to each other. In this operation, the Hall element detects the field magnet having the substantially sinusoidal waveform of which maximum amplitude varies in accordance with the above relative movement. As described above, the armature coil is supplied with the current having the sinusoidal waveform of the same cycle as that of the magnetic field in the sinusoidal form, and having the constant maximum amplitude. This current supplied to the armature coil depends on the intensity and direction of the magnetic field formed by the field magnet at the position where the armature coil is opposed to the field magnet. Thereby, even when the maximum amplitude of the magnetic field formed by the field magnet varies, it is possible to suppress an influence exerted by this variation on the driving force produced by the linear motor.

The foregoing and other objects, features, aspects and advantages of the present invention will become more apparent from the following detailed description, when taken in conjunction with the accompanying drawings.

BRIEF DESCRIPTION OF THE DRAWINGS

FIGS. 2(A) to 2(J) show waveforms at various portions in the current supply circuit in FIG. 1, FIG. 2(A) showing an example of a waveform of a magnetic flux density B (or intensity H of magnetic field) detected by a Hall element, FIGS. 2(B) and 2(C) showing waveforms of output voltages $V_1$ and $V_2$ from a Hall element, respectively, FIGS. 2(D) and 2(E) showing waveforms of output voltages $V_3$ and $V_4$ from comparators, respectively, FIGS. 2(F) and 2(G) showing waveforms of output voltages $V_5$ and $V_6$ from sinusoidal wave generating circuits, respectively, FIGS. 2(H) and 2(I) showing waveforms of output voltages $V_7$ and $V_8$ from offset circuits, respectively, and FIG. 2(J) showing a waveform of an output voltage of a differential amplifier;

FIG. 3(A) is a perspective view of the linear motor, and FIG. 3(B) is a cross section of the linear motor;

DESCRIPTION OF THE PREFERRED EMBODIMENTS

Figure 1:
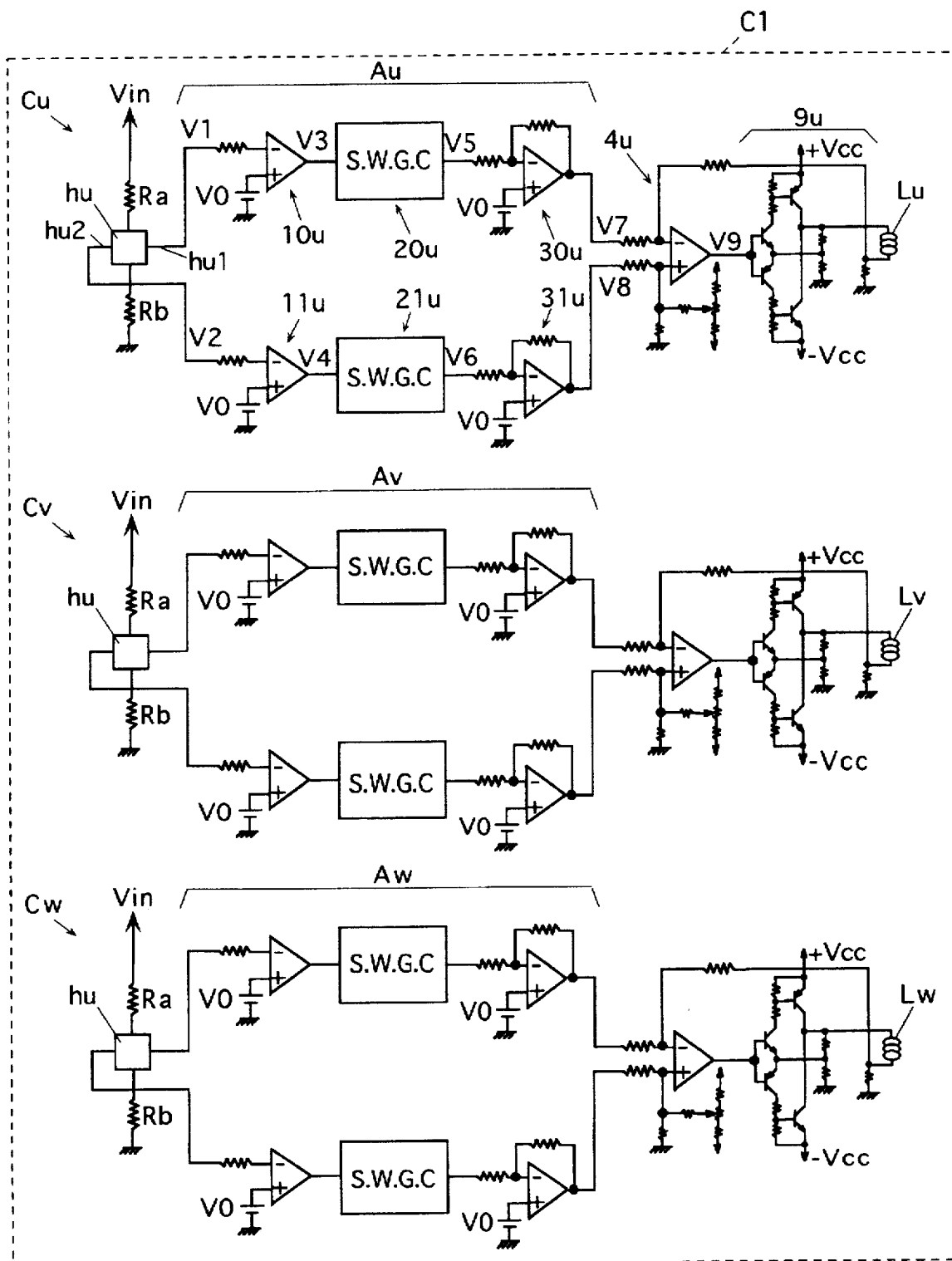
FIG. 1 shows an armature coil current supply circuit of a linear motor for three-phase driving according to the invention.

The linear motor apparatus, the armature coil current supply circuit and the method of supplying a current to the armature coil according to the invention described above will be described more in detail.

In any one of the linear motor apparatus, the armature coil current supply circuit and the armature coil current supply method according to the invention, the field magnet may include magnetic poles of N- and S-poles which are arranged linearly and alternately at an equal pitch. The field magnet produces a magnetic field having a substantially sinusoidal form along the longitudinal or extending direction of the stator.

In either of the linear motor apparatus and the armature coil current supply circuit according to the invention, the correction circuit may include, for example, a comparison circuit for comparing the output voltage of the Hall element and a predetermined reference voltage with each other to output a voltage signal of a square waveform, and a sinusoidal wave generating circuit for converting the output of the comparison circuit into a voltage signal of a sinusoidal waveform having the same cycle as the above voltage signal of the square waveform. The comparison circuit makes a comparison between the output voltage of the Hall element and the predetermined reference voltage, and outputs the voltage signal of the square waveform (pulse waveform) of a voltage equal to either of the predetermined different two voltages. The predetermined reference voltage may be a voltage, which is issued from the Hall element supplied with the Hall element reference input voltage when the Hall element is located at a position not exposed to a magnetic field. In this case, the output signal of the comparison circuit, which is being moved in a sinusoidal magnetic field formed along the longitudinal direction of the stator by the field magnet, may have the same cycle as the sinusoidal magnetic field.

Likewise, in the armature coil current supply method according to the invention, the correction, which is performed for correcting the output signal of the Hall element to have the same cycle as the Hall element output signal and to have a constant maximum amplitude corresponding to the Hall element reference input voltage, can be performed, for example, in such a manner that the output voltage of the Hall element is compared with a predetermined reference voltage to form a voltage signal of a square waveform, and the voltage signal of the square waveform is converted into a voltage signal of a sinusoidal waveform having the same cycle as the voltage signal of the square waveform. In the case where the predetermined reference voltage is a voltage, which is issued from the Hall element supplied with the Hall element reference input voltage when the Hall element is located at a position not exposed to a magnetic field, the output signal of the comparison circuit may have the same cycle as the sinusoidal magnetic field.

In either of the linear motor apparatus and the armature coil current supply circuit according to the invention, the correction circuit may include an offset circuit for superposing a predetermined offset voltage on the output of the sinusoidal wave generating circuit. The current supply circuit may include an amplifier circuit for amplifying the output voltage of the correction circuit, and the armature coil may be supplied with a current depending on the voltage signal issued from the correction circuit and amplified by the amplifier circuit.

In either of the linear motor apparatus and the armature coil current supply circuit according to the invention, three-phase driving of the linear motor may be performed for generating a constant driving force regardless of the positional relationship between the armature coil and the field magnet. In this case, the armature coil may be formed of three-phase coils arranged along the longitudinal direction of the stator and spaced from each other by a predetermined distance. In this case, the Hall element, the correction circuit and the current supply circuit may be provided for each of the three-phase coils for supplying the current to the coil of each phase in the foregoing manner.

Preferred embodiments of the invention will now be described below more in detail with reference to the drawings.

Figure 3A:
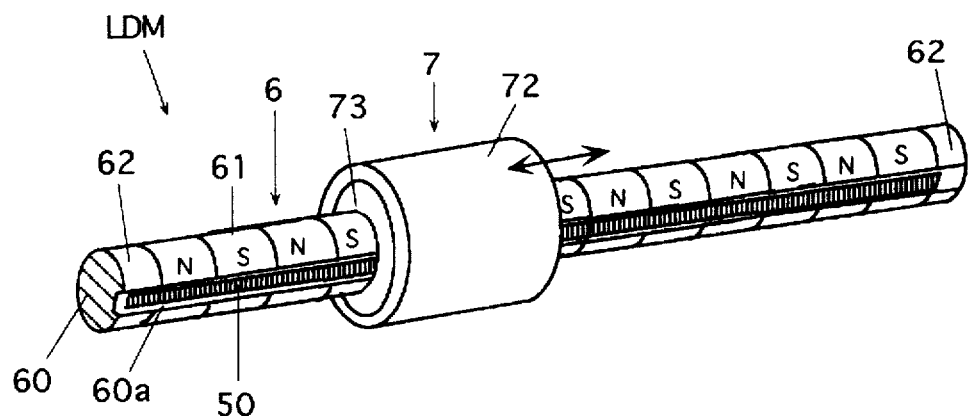
FIGS. 3(A) and 3(B) show an example of a linear motor to be driven by the armature coil current supply circuit of the invention.
Figure 3B:
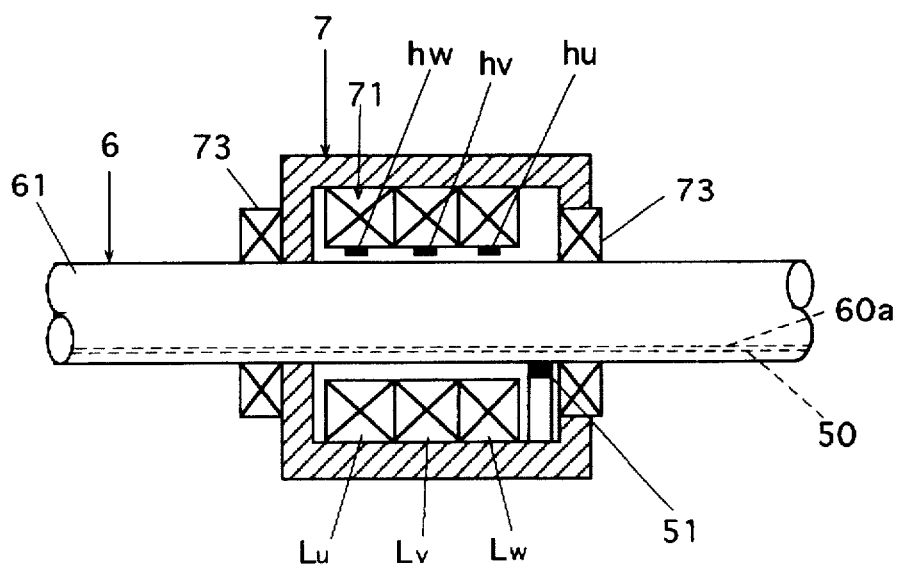

An armature coil current supply circuit according to the invention can be utilized as a current supply circuit to an armature coil of the linear motor shown in FIGS. 3(A) and 3(B). Accordingly, a schematic structure of the linear motor will first be described below. FIG. 3(A) is a perspective view of the linear motor, and FIG. 3(B) is a cross section of the linear motor. The armature coil current supply circuit according to the invention can be naturally applied to linear motors other than that in FIGS. 3(A) and 3(B).

In the linear motor LDM shown in FIGS. 3(A) and 3(B), a movable piece 7 can reciprocate along a stator 6 which is made of a straight rod 60 having a circular section and made of a machinable and magnetizable material.

The stator 6 has a drive field magnet 61, i.e., field magnet for driving, which is provided at its surface with N- and S-poles arranged alternately at an equal pitch and is magnetized to provide a magnetic flux distribution in a substantially sinusoidal form along the longitudinal direction of the stator 6. The stator 6 is provided with a stepped portion 60a in the form of a groove which extends longitudinally and has a substantially square section. A fine magnetized portion 50 which forms a part of a magnetic encoder for speed control of the movable piece 7 is formed at the bottom of the stepped portion 60a. The fine magnetized portion 50 is formed by providing magnetic N- and S-poles alternately at a fine and equal pitch.

The stator 6 is supported at its opposite ends 62 by unillustrated support means.

The movable piece 7 includes an armature coil 71 which is formed of a plurality of ring-shaped coils fitted around the stator 6 with a space therebetween. The armature 71 coil is carried at an inner side of a cylindrical movable piece yoke 72. The movable piece yoke 72 is provided at its opposite ends with bearings 73 to guide for movement of the movable piece 7 along the stator 6.

The armature coil 71 of the movable piece 7 is formed of three-phase ring-shaped coils Lu, Lv and Lw which are shifted from each other by an electric angle of $2\pi/3$ in the magnetic flux distribution. A Hall element hu opposed to the field magnet 61 is arranged at the u-phase coil Lu, and Hall elements hv and hw opposed to the field magnet 61 are likewise arranged at v-phase and w-phase coils, respectively. The movable piece yoke 72 is provided with a magnetic sensor (i.e., a sensor formed on a magnetoresistance element called an MR element in this embodiment) opposed to the fine magnetized portion 50 at the bottom of the stepped portion 60a.

The linear motor thus constructed is driven by an armature coil current supply circuit $C_1$ according to the invention in FIG. 1. FIG. 1 shows the armature coil current supply circuit for three-phase driving of the linear motor. This circuit $C_1$ has u-, v- and w-phase current supply circuits Cu, Cv and Cw for three-phase driving. These current supply circuits for the respective phases have the same structure, although they bear different suffixes "u", "v" and "w", respectively. Therefore, the structures and operations of them will be described below in connection with, for example, the armature coil current supply circuit Cu for u-phase.

The u-phase current supply circuit Cu is formed of the Hall element hu, comparators 10u and 11u, sinusoidal wave generating circuits 20u and 21u, offset circuits 30u and 31u, and a differential amplifier 4u, and supplies a current to the u-phase coil Lu. These comparators, sinusoidal wave generating circuits and offset circuits form a correction circuit Au.

The Hall element hu is supplied with a reference input voltage $V_{in}$ through protection resistances Ra and Rb. The Hall element hu is a magnetoelectric element having a resistance value of Rc, and outputs the voltages, which depend on the intensity and direction of the magnetic field detected by this Hall element and the reference input voltage $V_{in}$, from its two output terminals hu1 and hu2.

When the Hall element hu is located at a position where no magnetic field is present, no electric potential difference is present between the output voltages $V_1$ and $V_2$ from output terminals hu1 and hu2, and its output voltages $V_0$ ($=V_1=V_2$) can be expressed by the following formula:

$$V0 = \frac{Rb + \frac{Rc}{2}}{Ra + Rb + Rc} \cdot Vin \quad (7)$$

In case that the Hall element hu is located in the magnetic field, when the output voltage $V_1$ is expressed by the following formula (8):

$$V1 = \frac{Rb + \left(\frac{Rc}{2} + r\right)}{Ra + Rb + Rc} \cdot Vin = V0 + \frac{r}{Ra + Rb + Rc} \cdot Vin \quad (8)$$

the output voltage $V_2$ can be expressed by the following formula (9):

$$V2 = \frac{Rb + \left(\frac{Rc}{2} - r\right)}{Ra + Rb + Rc} \cdot Vin = V0 - \frac{r}{Ra + Rb + Rc} \cdot Vin \quad (9)$$

As can be seen from the above formulas, the output voltages $V_1$ and $V_2$ are distributed at opposite sides of $V_0$.

The output voltages $V_1$ and $V_2$ are supplied to comparators 10u and 11u and are compared with the voltage $V_0$, so that the output voltages $V_3$ and $V_4$ are issued, respectively.

The output voltages $V_3$ and $V_4$ are supplied to the sinusoidal wave generating circuits 20u and 21u. The sinusoidal wave generating circuits have well-known structures, therefore, the circuits 20u and 21u in this embodiment are specifically selected from various known structures in view of stability of the frequency and stability of the output level.

The output voltages $V_5$ and $V_6$ of the sinusoidal wave generating circuits 20u and 21u are supplied to offset circuits 30u and 31u, respectively, and an offset voltage which is the same as the voltage $V_0$ is superposed thereon. The offset voltages $V_7$ and $V_8$ after the offset are supplied to the differential amplifier 4u similarly to the prior art, and a current corresponding to the output voltage of the differential amplifier 4u is applied to the u-phase armature coil Lu through a transistor circuit 9u.

Description will now be given on operations of the Hall element hu, comparators 10u and 11u, sinusoidal wave generating circuits 20u and 21u, offset circuits 30u and 31u, and differential amplifier 4u with reference to drawings showing voltage waveforms and others at various portions in the circuit Cu. Each of the waveforms shown in FIGS. 2(A)–2(J) show a positional relationship of the Hall element hu with respect to the field magnet 61. FIG. 2(A) shows a magnetic flux density B (or intensity H of the magnetic field produced by the field magnet 61) detected by the Hall element hu. FIGS. 2(B) and 2(C) show the output voltages $V_1$ and $V_2$ from the terminals hu1 and hu2 of the Hall element hu, respectively. FIGS. 2(D) and 2(E) show output voltages $V_3$ and $V_4$ of comparators 10u and 11u, respectively. FIGS. 2(F) and 2(G) show the output voltages $V_5$ and $V_6$ of sinusoidal wave generating circuits 20u and 21u, respectively. FIGS. 2(H) and 2(I) show the output voltages $V_7$ and $V_8$ of the offset circuits 30u and 31u, respectively, and FIG. 2(J) shows an output voltage V, of a differential amplifier 4u.

The Hall element hu moves in the magnetic field produced by the field magnet 61 shown in FIG. 2(A) in accordance with the movement of the movable piece 7. This magnetic field varies substantially in a sinusoidal form. However, the maximum amplitude of the magnetic flux density B thereof (i.e., intensity H of the magnetic field) varies due to error or the like in manufacturing of the field magnet 61. When the magnetic flux density B detected by the Hall element hu varies in accordance with movement of the Hall element hu, the output voltages $V_1$ and $V_2$ of the Hall element hu have sinusoidal waveforms which have the same cycles as the magnetic flux density B and have the maximum amplitudes varying in the same manner as the magnetic flux density B, as shown in FIGS. 2(B) and 2(C). The waveform in FIG. 2(B) is symmetrical to that in FIG. 2(C) with respect to the voltage $V_0$.

When the output voltages $V_1$ and $V_2$ are supplied to the comparators 10u and 11u for comparison with the voltage $V_0$, i.e., reference voltage, they produce the output voltages $V_3$ and $V_4$ having the square waveforms of which center axes are defined by a voltage of 0 V, as shown in FIGS. 2(D) and 2(E), respectively. These comparator output voltages $V_3$ and $V_4$ are synchronized and have the same cycles with the input voltages $V_1$ and $V_2$ of the comparators 10u and 11u, respectively.

When the output voltages $V_3$ and $V_4$ of the comparators are supplied to the sinusoidal wave generating circuits 20u and 21u, the output voltages $V_5$ and $V_6$ of the sinusoidal waveforms, of which center axes are defined by a voltage of 0 V, are produced as shown in FIGS. 2(F) and 2(G), respectively. These output voltages $V_5$ and $V_6$ have the same cycles and phases as respect to the output voltages $V_1$ and $V_2$ of the Hall element hu, respectively, and have constant maximum amplitudes.

When the output voltages $V_5$ and $V_6$ of the sinusoidal wave generating circuits are supplied to the offset circuits 30u and 31u, respectively, they superpose the voltage $V_0$ on them to produce the output voltages $V_7$ and $V_8$, respectively. The output voltages $V_7$ and $V_8$ have sinusoidal waveforms, of which center axes are defined by the voltage $V_0$, and also have constant maximum amplitudes, the same cycles and the same phases as the voltages $V_5$ and $V_6$, respectively. Further, the output voltages $V_7$ and $V_8$ of the offset circuits 30u and 31u have the same cycles and phases as the output voltages $V_1$ and $V_2$ of the Hall element hu, respectively.

When the output voltages $V_7$ and $V_8$ of the offset circuits 30u and 31u are supplied to the differential amplifier 4u, the output voltage $V_9$ is produced. The output voltage $V_9$ is proportional to magnitude and direction of the magnetic flux density B (i.e., intensity and direction of the magnetic field H) shown in FIG. 2(A), and also has a constant maximum amplitude and the same cycle as the magnetic flux density B. A current corresponding to this output voltage $V_9$ is applied to the armature coil Lu through the transistor circuit 9u.

Unbalance may occur in outputs of the Hall element due to a certain geometrical difference in its resistance. The offset circuits also serve to correct the unbalanced voltages thus caused.

It may be possible to produce an output voltage, which is proportional to the magnitude and direction of the magnetic flux density B (intensity and direction of the magnetic field H) in FIG. 2(A) and has the constant maximum amplitude and the same cycle as the magnetic flux density B, corresponding to the output voltage $V_9$ only from the output voltages $V_2$ of the Hall element hu by the comparator, sinusoidal wave generating circuit, amplifier circuit and others. However, it is desirable to produce the voltage $V_9$ from the two output voltages $V_1$ and $V_2$ of the Hall element hu, because common mode noises can be eliminated by supplying the voltages through the differential amplifier circuit at the final stage, as is done in this embodiment.

The v-phase and w-phase current supply circuits have the same structures as the u-phase current supply circuit Cu described above, and operate in a manner similar to that of the u-phase current supply circuit Cu. However, the Hall elements hv and hw are arranged at positions shifted by the phase angles of $2\pi/3$ to each other and from the Hall element hu. Therefore, the currents applied to the armature coils Lv and Lw are shifted by the phase angles of $2\pi/3$ to each other and from the current corresponding to the voltage $V_9$ of the circuit Cu.

According to the armature coil current supply circuit of the invention, the comparators, sinusoidal wave generating circuits, offset circuits and differential amplifier circuit can correct the possible variation in the maximum amplitude of the magnetic flux distribution formed by the field magnet 61. Thereby, the armature coil can be supplied with such a current, which is proportional to the magnitude and direction of the magnetic flux density (intensity and direction of the magnetic field H) of the magnetic flux distribution and has the same cycle (phase) as the magnetic flux density and the constant maximum amplitude. Accordingly, it is possible to reduce an influence which is exerted on the driving force produced by each armature coil caused by variation in the maximum amplitude of the magnetic flux distribution formed by the field magnet, and thus it is possible to reduce an influence on the whole driving force of the linear motor caused by the above variation.

Figure 5:
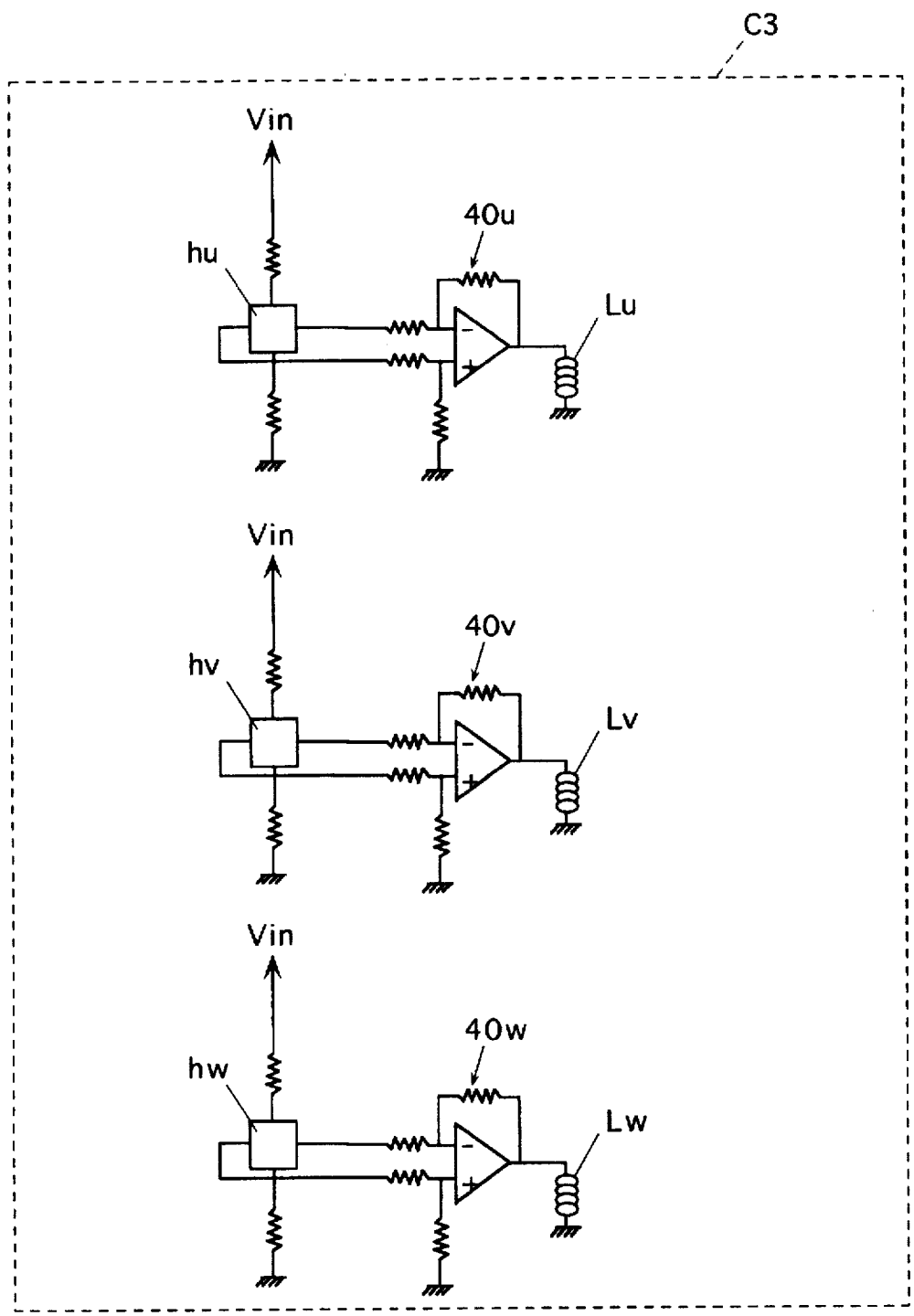
FIG. 5 shows an armature coil current supply circuit employing Hall elements in the prior art.

In the case where three-phase driving is employed, as is done in this embodiment, the armature coil of each phase can be supplied with such a current, which is proportional to the magnitude and direction of the magnetic flux density (intensity and direction of the magnetic field) of the magnetic flux distribution at the position of the same coil and has the same cycle (phase) as the magnetic flux density and the constant maximum amplitude. Therefore, the driving force of the linear motor can be stable without being significantly affected by variation in the maximum amplitude of the magnetic flux density. For example, when the magnetic flux density decreases by 10%, the armature coil current supply circuit of the invention can drive the linear motor to produce about 90% of the original driving force in contrast to the conventional current supply circuit in FIG. 5, which reduces the driving force of the linear motor to about 81%.

Figure 4:
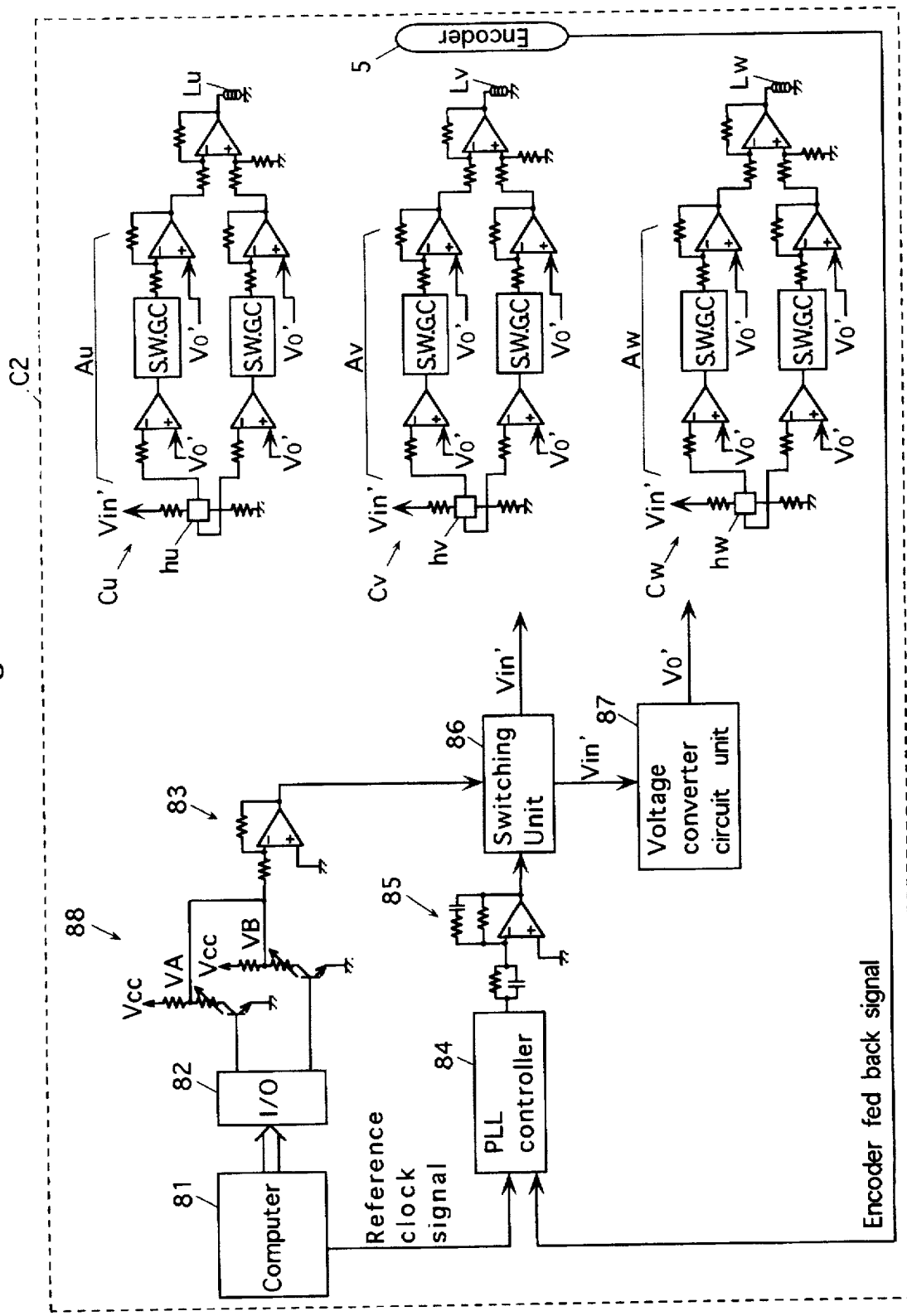
FIG. 4 shows a linear motor drive circuit employing an armature coil current supply circuit of the invention for performing PLL control.

The armature coil current supply circuit C, described above may be used together with a PLL (Phase-Locked Loop) control circuit for forming a linear motor drive circuit. An example of this structure is shown in FIG. 4. A linear motor drive circuit $C_2$ can likewise be used for driving the linear motor shown in FIG. 3.

Structures and operations of armature coil current supply circuits of the respective phases in this drive circuit $C_2$ are substantially the same as those of the circuit $C_1$ shown in FIG. 1 except that the reference input voltage supplied to each Hall elements hu, hv and hw is a voltage $V_{in}'$ supplied from a switching unit 86 instead of voltage $V_{in}$ in the circuit $C_1$, that the comparator uses a comparison voltage $V_0'$ instead of the voltage $V_0$ and that the offset circuit uses an offset voltage $V_0'$ instead of the voltage $V_0$. The voltages $V_{in}'$ and $V_0'$ will be described later. Parts and portions performing the substantially same operations as those in FIG. 1 bear the same reference numbers or characters.

In FIG. 4, 81 indicates a microcomputer which instructs a predetermined operation of the linear motor LDM and also sends a reference clock signal to a phase synchronous controller 84. 82 indicates an input/output port of the computer 81, 88 indicates a drive control circuit, and 83 indicates an amplifier. 86 indicates the switching unit, 84 indicates the phase synchronous controller, and 85 indicates a compensation circuit.

According to the control circuit $C_2$ shown in FIG. 4, the computer 81 supplies the reference clock signal corresponding to an intended speed to the phase synchronous controller (PLL controller) 84, and the moving speed signal of the movable piece 7 is fed back from the encoder 5, which is formed of the fine magnetized portion 50 on the stator 6 and a magnetic sensor 51 on the movable piece 7, to the PLL controller 84. The PLL controller 84 issues a signal depending on differences in the frequency and phase between the pulse of the reference clock signal and the pulse of the signal fed back from the encoder 5. The compensation circuit 85 compensates gaining or losing in a transferring system and sends the signal to the switching unit 86.

The drive control circuit 88 can switch the instruction voltage to the Hall element between different values for acceleration and constant-rate driving of the linear motor LDM. The computer 81 performs this switching through the input/output port 82, and thereby selects one of the instruction voltages $V_A$ or $V_B$ of different values. For acceleration, the substantially maximum voltage which the Hall element can withstand is used. The instruction voltage is amplified by the amplifier 83, and is supplied to the switching unit 86.

The switching unit 86 operates based on the inputs from the amplifier 83 and compensation circuit 85, and specifically issues the voltage $V_{in}'$ which corresponds to a phase difference between the encoder signal and the reference clock signal, i.e., corresponding to the instruction voltage and intended speed. The output voltage $V_{in}'$ forms a reference input voltage for the Hall elements hu, hv and hw of the armature coil current supply circuits Cu, Cv and Cw of the respective phases.

Since the voltage $V_{in}'$ varies, the comparison voltage at each comparator of the armature coil current supply circuits Cu, Cv and Cw as well as the offset voltage in the offset circuit must be a voltage $V_0'$ corresponding to the Hall element reference input voltage $V_{in}'$ expressed by the following formula (10). For this purpose, there is provided a voltage converter circuit unit 87. The output of the voltage converter circuit unit 87 is supplied, as the comparison voltage $V_0'$, to each comparator of the current supply circuits Cu, Cv and Cw, and is also supplied, as the offset voltage $V_0'$, to the offset circuit.

$$V_0' = \frac{Rb + \frac{Rc}{2}}{Ra + Rb + Rc} \cdot Vin' \quad (10)$$

Accordingly, in this drive circuit $C_2$, even if the maximum amplitude in the magnetic flux distribution varies, each of the armature coils of the respective phases can be supplied with the current, which is proportional to the magnitude and direction of the magnetic flux density B (intensity and direction of the magnetic field H) at the position of the coil of each phase and has the same cycle (phase) as the magnetic flux density and the constant maximum amplitude. Therefore, the driving force of the linear motor can be stable without being significantly affected by variation in the maximum amplitude of the magnetic flux distribution. Further, the phases of the reference clock signal and the encoder signal can be matched with each other by the PLL control circuit 84 and others depending on the intended speed, and thus the movable piece 7 can attain the intended speed. Therefore, the speed stability can be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A linear motor apparatus comprising:
    a stator extending in a predetermined direction and having a field magnet for driving;
    a movable piece having an armature coil opposed to said field magnet, and being reciprocatable along said stator;
    a Hall element disposed at a portion on said movable piece opposed to said field magnet for outputting a voltage signal depending on an intensity and a direction of a magnetic field formed by said field magnet as well as a Hall element reference input voltage supplied thereto;
    a correction circuit for producing an output signal by correcting an output signal issued from said Hall element to have a cycle equal to that of said Hall element output signal and a constant maximum amplitude depending on said Hall element reference input voltage; and
    a current supply circuit for supplying a current, depending on the output voltage issued from said correction circuit, to said armature coil for producing a driving force of said movable piece.

2. The linear motor apparatus according to claim 1, wherein
    said field magnet includes magnetic poles of N- and S-poles arranged alternately at an equal pitch along a predetermined direction.

3. The linear motor apparatus according to claim 1, wherein
    said field magnet produces a magnetic field having a substantially sinusoidal form along the extending direction of said stator.

4. The linear motor apparatus according to claim 1, wherein
    said correction circuit includes a comparison circuit for comparing the output voltage of said Hall element and a predetermined reference voltage with each other to output a voltage signal of a square waveform, and a sinusoidal wave generating circuit for converting the output of said comparison circuit into a voltage signal of a sinusoidal waveform having the same cycle as said voltage signal of the square waveform.

5. The linear motor apparatus according to claim 4, wherein
    said predetermined reference voltage is a voltage, which is issued from said Hall element supplied with said Hall element reference input voltage when said Hall element is located at a position not exposed to a magnetic field.

6. The linear motor apparatus according to claim 4, wherein
    said correction circuit includes an offset circuit for superposing a predetermined offset voltage on the output of said sinusoidal wave generating circuit.

7. The linear motor apparatus according to claim 1, wherein
    said armature coil is formed of three-phase coils arranged along the longitudinal direction of said stator and spaced from each other by a predetermined distance.

8. The linear motor apparatus according to claim 7, wherein said Hall element, said correction circuit and said current supply circuit are provided for each of said three-phase coils.

9. A linear motor apparatus comprising:
    a stator having a field magnet for driving, said field magnet being provided with magnetic poles of N- and S-poles arranged alternately at an equal pitch along a predetermined direction and produces a magnetic field having a substantially sinusoidal form;
    a movable piece having an armature coil opposed to said field magnet and formed of three-phase coils arranged along the longitudinal direction of said stator and spaced from each other by a predetermined distance, and being reciprocatable along said stator;
    three Hall elements located at positions where said three-phase coils are opposed to said field magnet, respectively, opposed to said field magnet and disposed at portions on said movable piece, each of said Hall elements being operable to output a voltage signal depending on an intensity and a direction of a magnetic field formed by said field magnet as well as a Hall element reference input voltage supplied thereto;
    correction circuits each for producing an output signal by correcting the output signal issued from the corresponding one of said Hall elements to have a cycle equal to that of said Hall element output signal and a constant maximum amplitude depending on said Hall element reference input voltage; and current supply circuits each for supplying a current, depending on the output voltage issued from the corresponding one of said correction circuits, to said coil of the corresponding phase for producing a driving force of said movable piece.

10. The linear motor apparatus according to claim 9, wherein each of said correction circuits includes a comparison circuit for comparing the output voltage of said Hall element and a predetermined reference voltage with each other to output a voltage signal of a square waveform, and a sinusoidal wave generating circuit for converting the output of said comparison circuit into a voltage signal of a sinusoidal waveform having the same cycle as said voltage signal of the square waveform.

11. The linear motor apparatus according to claim 10, wherein said predetermined reference voltage is a voltage, which is issued from said Hall element supplied with said Hall element reference input voltage when said Hall element is located at a position not exposed to a magnetic field.

12. The linear motor apparatus according to claim 11, wherein each of said correction circuits includes an offset circuit for superposing a predetermined offset voltage on the output of said sinusoidal wave generating circuit.

13. An armature coil current supply circuit for a linear motor provided with a stator having a field magnet for driving and a movable piece having an armature coil opposed to said field magnet, comprising:

a Hall element disposed at a portion on said movable piece, opposed to said field magnet at the position where said armature coil is opposed to said field magnet, and being operable to output a voltage signal depending on an intensity and a direction of a magnetic field formed by said field magnet as well as a Hall element reference input voltage supplied to the Hall element;

a correction circuit for producing an output signal by correcting the output signal issued from said Hall element to have a cycle equal to that of said Hall element output signal and a constant maximum amplitude depending on said Hall element reference input voltage; and a current supply circuit for supplying a current, depending on the output voltage issued from said correction circuit, to said armature coil for producing a driving force of said movable piece.

14. The armature coil current supply circuit according to claim 13, wherein said field magnet includes magnetic poles of N- and S-poles arranged alternately at an equal pitch along a predetermined direction, and forms a substantially sinusoidal magnetic field.

15. The armature coil current supply circuit according to claim 14, wherein said correction circuit includes a comparison circuit for comparing the output voltage of said Hall element and a predetermined reference voltage with each other to output a voltage signal of a square waveform, and a sinusoidal wave generating circuit for converting the output of said comparison circuit into a voltage signal of a sinusoidal waveform having the same cycle as said voltage signal of the square waveform.

16. The armature coil current supply circuit according to claim 15, wherein said predetermined reference voltage is a voltage, which is issued from said Hall element supplied with said Hall element reference input voltage when said Hall element is located at a position not exposed to a magnetic field.

17. The armature coil current supply circuit according to claim 15, wherein said correction circuit includes an offset circuit for superposing a predetermined offset voltage on the output of said sinusoidal wave generating circuit.

18. The armature coil current supply circuit according to claim 14, wherein said current supply circuit includes an amplifier circuit for amplifying the output voltage of said correction circuit.

19. A method of supplying a current to an armature coil of a linear motor including a field magnet for driving, and said armature coil opposed to said field magnet and provided with a Hall element for outputting a voltage signal depending on an intensity and a direction of a magnetic field formed by said field magnet as well as a Hall element reference input voltage supplied to said Hall element, wherein the Hall element output signal issued from said Hall element is corrected to have a cycle equal to that of said Hall element output signal and a constant maximum amplitude depending on said Hall element reference input voltage; and a current depending on the corrected voltage signal is supplied to said armature coil.

20. The armature coil current supply method according to claim 19, wherein said field magnet includes magnetic poles of N- and S-poles arranged alternately at an equal pitch along a predetermined direction, and forms a substantially sinusoidal magnetic field.

21. The armature coil current supply method according to claim 20, wherein said correction effected on said Hall element output signal issued from said Hall element to have a cycle equal to that of said Hall element output signal and a constant maximum amplitude depending on said Hall element reference input voltage is performed by comparing the output voltage of said Hall element and a predetermined reference voltage with each other to output a voltage signal of a square waveform, and converting said voltage signal of the square waveform into a voltage signal of a sinusoidal waveform having the same cycle as said voltage signal of the square waveform.

22. The armature coil current supply method according to claim 21, wherein said predetermined reference voltage is a voltage, which is issued from said Hall element supplied with said Hall element reference input voltage when said Hall element is located at a position not exposed to a magnetic field.

* * * * *